Figure 1:
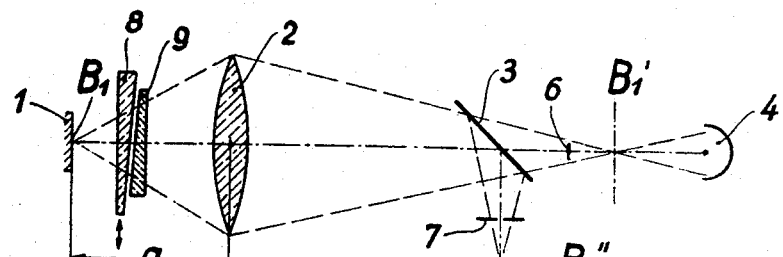

July 12, 1960

K. SCHÜCH 2,945,132

MEASURING APPARATUS HAVING OPTICAL
AND PHOTOELECTRIC MEANS

Filed March 18, 1957

2 Sheets-Sheet 1

Inventor:

Kurt Schüch

United States Patent Office 2,945,132
Patented July 12, 1960

2,945,132

MEASURING APPARATUS HAVING OPTICAL AND PHOTOELECTRIC MEANS

Kurt Schüch, Jena, Germany, assignor to VEB Carl Zeiss Jena, Jena, Germany

Filed Mar. 18, 1957, Ser. No. 646,928

3 Claims. (Cl. 250—220)

The invention concerns an apparatus having optical and photoelectric means for measuring changes of position of a near object with utmost precision by means of the effect which light emitted by a luminous spot on the surface of this object produces on a photoelectric device, for instance a system of photoelectric cells.

Apparatus of this kind, in which the luminous spot on the surface of the object to be measured is, as a rule, produced by imaging a definite source of light, and which serve the purpose of substituting objective measurement for subjective measurement, have been used to measure the position of an object provided with the lines of a scale or to measure the position of the lines of a scale.

The invention aims at making a measuring apparatus of this kind available for measuring deformations in length. To this effect the image-side ray path of a lens system for imaging a luminous spot is provided with a system of diaphragms so disposed and constructed that changes in the ray path due to changes in the position of the luminous spot in the direction of the optical axis of the lens system entail in the photoelectric device changes in voltage by means of which the change of position can be measured.

An apparatus of this description, which, similarly to the devices working on the pneumatic principle, measures minute deformations in length, permits to check workpieces without interruption of the machining operation, thus enabling the operator to detect, for instance, alterations in the diameters of shafts, balls or boreholes as well as in the thickness of plates and the like.

An advantageous constructional form of the measuring apparatus according to the invention is obtained by providing means in the image-side ray path which divide this ray path into two parts, and by so locating and constructing the diaphragm system as to produce in the photoelectric device two voltages which are equal to each other when the luminous spot is at its zero measuring position.

It is advisable to cut the light down outside the plane in which the lens system images a luminous spot that it is in its measuring position zero. It is also convenient to dispense with semi-transparent mirrors for dividing the ray path and to locate and construct the diaphragm system in such a manner as to effect both the cutting down of the light and the division of the ray path. The photoelectric device will be most simple in construction if the two ray paths are directed to it alternately by a rotating diaphragm.

To prevent light-flux variations from influencing the measurement, it is expedient to provide that voltage differences in the photoelectric device due to axial deviations of the luminous spot from its measuring position zero are reduced to zero without any changes in the location of the diaphragms. This can be realized by any known zero adjusting appliance, for instance an optical compensator suitably disposed in the image-side ray path, the compensator adjustment being a measure of changes of the distance apart of the object and its measuring position zero.

The measuring apparatus can be made automatic by causing the photoelectric device to influence a sensitive galvanometer relay controlling a following mechanism adjusting the compensator. It is also possible to control the working machine in such a manner as to ensure a machining true to measure when the workpiece underlying the measuring process alters its axial dimension while being tooled.

Other advantageous constructional forms are obtained by using, instead of the above-described means for dividing the ray path, means causing the image of the luminous spot to effect continuous oscillatory movements relatively to a diaphragm in the direction of the optical axis of the lens syetem, the purpose of these oscillations being to obtain the magnitude zero in an indicating device, in the output circuit of the photoelectric device, when the luminous spot assumes its measuring position zero.

The said relative movements can be produced, for instance, by the oscillations either of an optical member lying in the image-side ray path, for instance a negative lens displaceable in the direction of the optical axis of a lens system, or of a glass wedge displaceable at right angles to this axis and belonging to a system of two glass wedges the relative displacement of which has the effect of changing the thickness of a plano-parallel glass plate. The vibration could be effected as well by a photocell provided with means for cutting the light down.

When measuring non-luminous objects, which means that the luminous spot requires to be produced on the surface of the object by imaging a source of light, it is advisable to provide that this source is as punctiform as possible or to image a corresponding diaphragm aperture illuminated from the rear.

Figures 1 to 6 of the accompanying drawing illustrate schematically six varieties of the optical system of a measuring apparatus according to the invention.

The system according to Figure 1 is meant for measurements on a self-luminous object 1. This system has an objective 2 which is at a distance $a$ from a luminous spot $B_1$ on the surface of the object to be measured and images this spot $B_1$ in a plane $B_1'$. In the image-side ray path of the objective 2 is disposed a semi-transparent mirror 3 which splits up the ray path into two parts. The rays of the one part are directed to a photocell 4, those of the other to a photocell 5. In the two parts of the ray path are diaphragms 6 and 7 lying, respectively, before the image plane $B_1'$ and before a plane $B_1''$ which is in mirror-image position relatively to $B_1'$ with respect to the mirror 3 and has such dimensions that the two photocells receive equal luminous fluxes when the distance $a$ has a definite magnitude. Between the object 1 to be measured and the objective 2 is disposed a compensator consisting of two glass wedges 8 and 9 which constitute a plano-parallel plate. The wedge 8 is displaceable at right angles to the optical axis X—X of the objective 2, so as to enable the thickness of the plano-parallel plate to be altered and, consequently, the luminous fluxes acting on the two photocells 4 and 5 to be equalized as soon as the distance $a$ changes a little.

Figure 2:
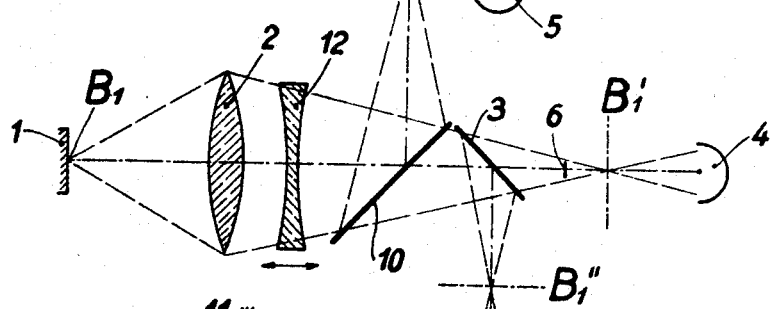

The system according to Figure 2, like all the following systems here described, is meant to effect measurements on an object the surface of which is not self-luminous but requires a luminous spot $B_1$ to be produced on it. To this effect a semi transparent mirror 10 is disposed in the path of the imaging rays of the objective 2, the purpose of this mirror being to direct to the objective 2 the light rays emanating from a punctiform light-source 11. The system according to Figure 2 differs in all other respects from the system shown by Figure 1 only in that the compensator is an axially displaceable negative lens 12 in the rear of the objective 2.

Figure 3:
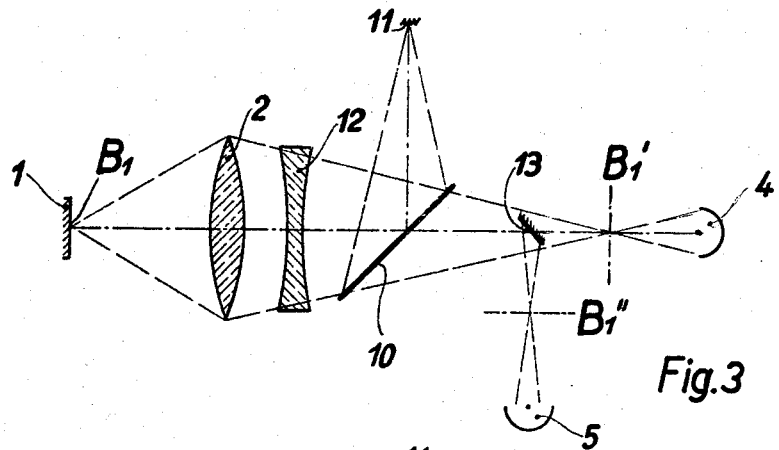

The system illustrated by Figure 3 differs from the one of Figure 2 only in that the semi-transparent mirror 3 and the diaphragms 6 and 7 have been replaced by a fully silvered mirror 13. This mirror 13 is so positioned and dimensioned as to effect the division of the ray path and to cause the two photocells 4 and 5 to be influenced by equal fluxes of light when the luminous spot $B_1$ is at a definite distance $a$ from the objective 2.

Figure 4:
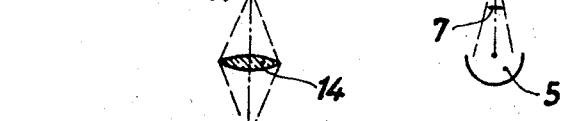
Figure 4:
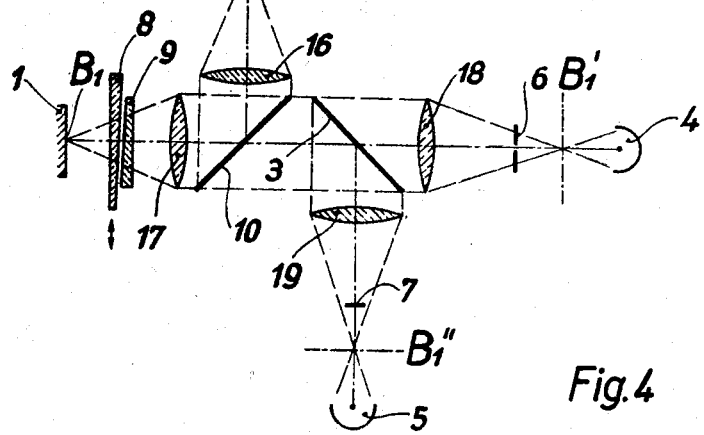

In the system shown by Figure 4, the semi-transparent mirrors 3 and 10 are disposed in the parallel, and not as in Figure 2 in the convergent, ray path. Accordingly, the rays emanating from the punctiform light-source 11 and producing the luminous spot $B_1$ pass through a condenser 14 and a luminous-field diaphragm 15 and arrive at an objective 16 which is disposed before the mirror 10 and transmits them axially parallel to this mirror, where they are reflected axially parallel to an objective 17 in the focal plane of which, on the object 1, they produce the luminous spot $B_1$. Inversely, the rays emanating from the luminous spot are made axially parallel by the objective 17. The part of the rays which has passed through the semi-transparent mirror 3 is so refracted by an objective 18 that an image of the luminous spot appears in the focal plane $B_1'$ of this objective. The part of the rays which has been reflected by the mirror 3 strikes an objective 19, which is equal to the objective 18 and in whose focal plane $B_1''$ another image of the luminous spot $B_1$ appears. The photocells 4 and 5 as well as the diaphragms 6 and 7 are arranged as in the systems described hereinbefore. Analogous to the system according to Figure 1, the compensator is a system of glass wedges 8, 9 between the object to be measured and the objective 17 imaging the luminous spot.

Figure 5:
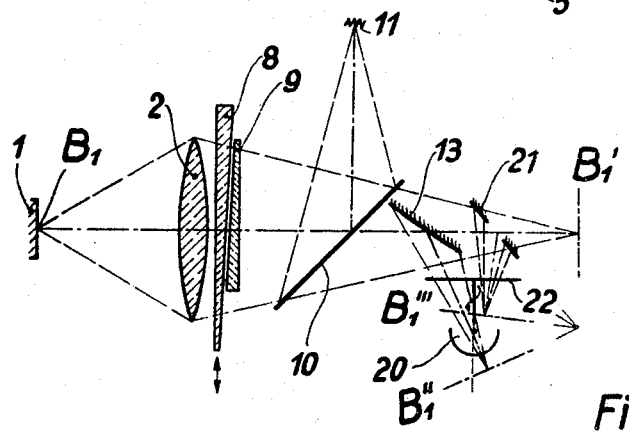

The system illustrated by Figure 5 belongs to a measuring apparatus having only one photocell, which is designated 20. It differs from the system according to Figure 3 as follows: Behind the objective 2 is a system of glass wedges 8, 9 and no negative lens. The fully silvered mirror 13 is inclined at an angle inferior to 45° relatively to the optical axis of the objective 2, so that the image planes $B_1'$ and $B_1''$ intersect each other at an angle greater than 90°. A fully silvered annular mirror 21 inclined relatively to the optical axis of the objective 2 at an angle greater than 45° prevents the luminous spot $B_1$ being imaged in the image plane $B_1'$ of the objective 2 and causes an image to be produced in the image plane $B_1'''$ which includes together with the image plane $B_1'$ an angle smaller than 90°. All image planes have one and the same line of intersection, which also the reflecting surfaces of the mirrors 13 and 21 have in common. The light reflected by these mirrors strikes a rotating disc 22 having radial slits (not shown) which control the admission of light to the photocell 20 in such a manner that this cell is struck successively by the rays reflected by the one and by the rays reflected by the other of the two mirrors.

Figure 6:
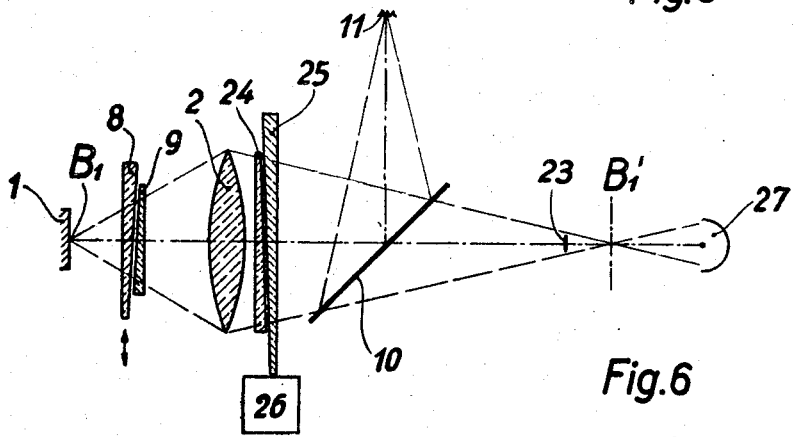

The system according to Figure 6 is designed for a measuring apparatus in which a continuous oscillatory movement of the light-spot image relative to a diaphragm 23 is produced through the agency of a system of glass wedges disposed in the rear of the objective 2 and comprising, similarly to the compensator 8, 9, two glass wedges 24 and 25, of which wedge 25 is movable at right angles to the optical axis of the objective 2 and so actuated by a device 26 (only the contours of which are shown) as to effect in the said direction oscillations entailing a continuous change in the thickness of the plano-parallel glass plate formed by the wedges 24 and 25 and, accordingly, the said continuous oscillatory movement of the luminous-spot image relative to the diaphragm 23.

This system requires only one photocell 27. The compensator is disposed between the object 1 to be measured and the objective 2. The device for producing the luminous spot is the same as for instance that in the system according to Figure 2. The rays emanating from a punctiform light-source 11 are directed to the objective 2 by means of a semi-transparent mirror 10.

I claim:

1. In an optical apparatus for measuring changes of position of a near object with utmost precision, a photoelectric device, a luminous spot on the surface of said object, said luminous spot emitting light and producing an effect on said photoelectric device, a lens system imaging said luminous spot, a system of diaphragms located in the image-side ray path of said lens system and splitting said ray path in two beams, the intensity of the light impinging from said beams on said photoelectric device being changed by means of said diaphragms upon displacement of said spot along the optical axis of said ray path and producing changes of voltage in the output of said photoelectric device, and a compensating device disposed in the ray path, said compensating device so influencing said ray path that the partial ray-pencils in the rear of said diaphragms are of equal intensity in the direction of the incident light and that no changes of voltage arise in the output of said photoelectric device and the position of said compensating device is a measure of the position of the object relative to a definite zero position.

2. In an optical apparatus for measuring changes of position of a near object with utmost precision, a photoelectric device, a luminous spot on the surface of said object, said luminous spot emitting light and producing an effect on said photoelectric device, a lens system imaging said luminous spot, a system of diaphragms located in the image-side ray path of said lens system and splitting said ray path in two beams, the intensity of the light impinging from said beams on said photoelectric device being changed by means of said diaphragms upon displacement of said spot along the optical axis of said ray path and producing changes of voltage in the output of said photoelectric device, and a compensating device consisting of two equal glass wedges so arranged in parallel juxtaposition in said ray path as to have the effect of a plane-parallel glass plate, the thickness of said plate being adjustable by displacement of the one of said wedges at right angles to the optical axis of said ray path, said compensating device so influencing said ray path that the partial ray-pencils in the rear of said diaphragms are of equal intensity in the direction of the incident light and that no changes of voltage arise in the output of said photoelectric device and the position of said displaced wedge is a measure of the position of the object relative to a definite zero position.

3. In an optical apparatus for measuring changes of position of a near object with utmost precision, a photoelectric device, a luminous spot on the surface of said object, said luminous spot emitting light and producing an effect on said photoelectric device, a lens system imaging said luminous spot, a system of diaphragms located in the image-side ray path of said lens system and splitting said ray path in two beams, the intensity of the light impinging from said beams on said photoelectric device being changed by means of said diaphragms upon displacement of said spot along the optical axis of said ray path and producing changes of voltage in the output of said photoelectric device, and a compensating device consisting of a biconcave lens disposed in said ray path, the position of said lens being adjustable in the direction of the optical axis of said ray path and so influencing said ray path that the partial ray-pencils in the rear of said diaphragms are of equal intensity in the direction of the incident light and that no changes of voltage arise in the output of said photoelectric device and the position of said biconcave lens is a measure of the position of the object relative to a definite zero position.

References Cited in the file of this patent
UNITED STATES PATENTS

| | | |
|---|---|---|
| 2,142,378 | Sachtleben | Jan. 3, 1939 |
| 2,494,607 | Bouchet | Jan. 17, 1950 |
| 2,670,651 | Burns et al. | Mar. 2, 1954 |
| 2,806,405 | St. Amand | Sept. 17, 1957 |